May 30, 1961 R. BECKADOLPH 2,986,191
TIRE
Filed July 1, 1957 2 Sheets-Sheet 1
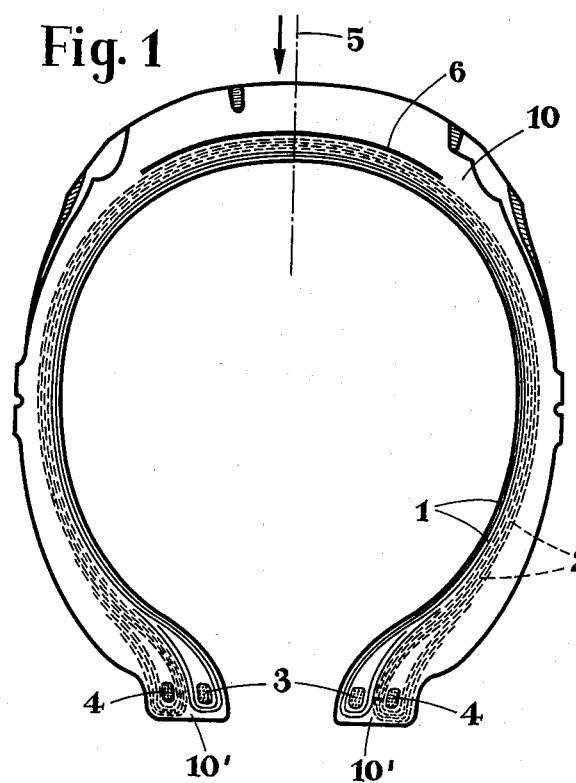
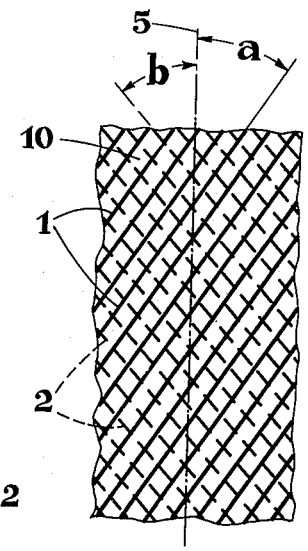
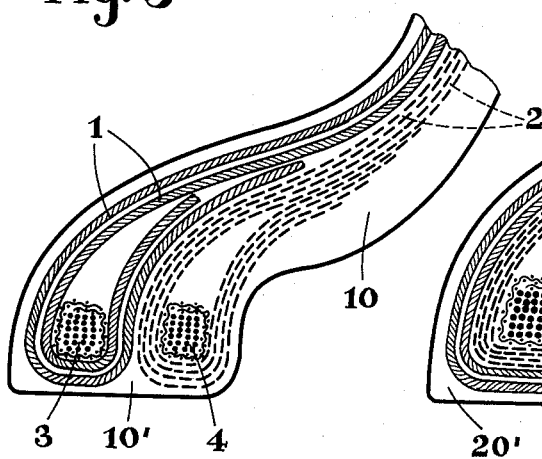
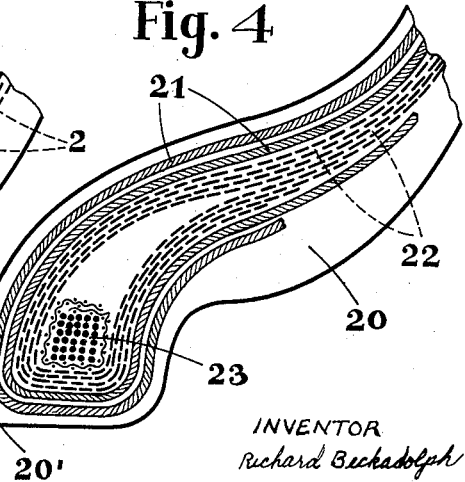
INVENTOR
Richard Beckadolph
BY: Michael S. Striker
agt.

May 30, 1961 R. BECKADOLPH 2,986,191
TIRE
Filed July 1, 1957 2 Sheets-Sheet 2

INVENTOR
Richard Beckadolph
BY: Michael S. Striker
agt.

United States Patent Office 2,986,191
Patented May 30, 1961

2,986,191
TIRE

Richard Beckadolph, Grasdorf, Uber Hannover, Germany, assignor to Firma Continental Gummi-Werke Aktiengesellschaft, Hannover, Germany Filed July 1, 1957, Ser. No. 669,211
4 Claims. (Cl. 152—356)

The present invention relates to tires.

More particularly, the present invention relates to reinforced tires for automotive and other vehicles, and this application is a continuation-in-part application of copending application Serial No. 340,305 filed March 4, 1953, and now abandoned.

It is one of the objects of the present invention to provide a reinforced tire which is capable of absorbing stresses applied from different directions.

It is another object of the present invention to provide a tire reinforcement which reinforces the tire to varying extents.

It is yet another object of the present invention to provide a tire which is so constructed that inner friction and heat are maintained very low.

The objects of the present invention also include the provision of a reinforced tire which will have a long useful life.

It is also an object of the present invention to provide a reinforced tire which may economically be mass-produced by conventional tire manufacturing techniques.

With the above objects in view, the present invention mainly consists in a tire which includes a tire body in which a plurality of first and second filaments are embedded, the stretchability of the second filaments being substantially greater than that of the first filaments. The first filaments are arranged substantially parallel to each other and are inclined to the transverse plane of symmetry of the tire body, and the second filaments are also arranged substantially parallel to each other and are inclined to this plane but cross over the first filaments.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a transverse sectional view through a tire constructed in accordance with the present invention;

Fig. 2 is a fragmentary view of the tire shown in Fig. 1, as seen in the direction of the arrow, showing the disposition of the reinforcements;

Fig. 3 is a fragmentary enlarged diagrammatic view of a part of the tire shown in Fig. 1;

Fig. 4 is a fragmentary diagrammatic view of a modified construction of the part shown in Fig. 3;

Figure 5:
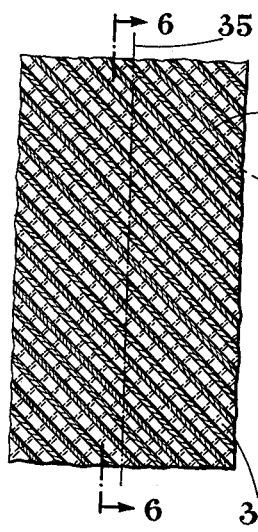
Fig. 5 is a diagrammatic representation of the manner in which the reinforcements in a tire may be arranged in one embodiment of the present invention.

Referring now to the drawings, and to Figs. 1–3 thereof in particular, there is shown a tire having a tire body 10 in which a plurality of reinforcement filaments 1 and 2 are embedded. The filaments 1 are shown in solid lines whereas the filaments 2, which have a stretchability substantially greater than that of the filaments 1, are shown in dotted lines. The filaments 1, which may be of wire, are arranged in two layers adjacent the inner surface of the tire body, and the filaments 2, which may be of natural or synthetic fibers, are arranged in four layers located exteriorly of, i.e., covering, the layers of filaments 1. As is illustrated on an enlarged scale in Fig. 3, the wire filaments 1 extend about two annular anchoring beads 3, one of which is embedded in the tire body 10 adjacent one of the inner free edges 10' and the other of which beads is embedded in the tire body 10 adjacent the other inner free edge 10'. Similarly, the fiber filaments 2 extend about two annular anchoring beads 4 which are located adjacent the beads 3.

As may best be seen from Fig. 2, the wire filaments 1 are substantially parallel to each other and are inclined to the transverse plane of symmetry of the tire body 10, which plane is indicated at 5 and is perpendicular to the axis of the tire (not shown). Similarly, the fiber filaments 2 are substantially parallel to each other and are also inclined to the plane 5 but in the opposite direction as the wire filaments so that the fiber filaments cross over the wire filaments. The angles which the filaments 1 and 2 form with the plane 5 are indicated at a and b, respectively. These angles are preferably substantially equal to each other and lie within the range of 20° to 60°, and an angle of approximately 45° has been found to be particularly desirable.

By virtue of the above arrangement, relatively few filaments are sufficient to provide a very strong tire so that a tire having a relatively thin wall may be produced, which results in a decrease in the inner friction and heating of the tire. Also, the fact that the filaments themselves are of a relatively small number further decreases the inner friction of the tire, while the filaments of low stretchability still enable the tire to be used with relatively great loads.

Also, by virtue of the fact that the filaments of relatively high stretchability are positioned according to the present invention, each filament of low stretchability can assume a position in which it absorbs its proportionate share of the load, thereby avoiding the absorption of the entire load by any one filament or any one group of filaments. Additionally, the absence of sharp bends avoids the danger of breakage of any one of the filaments.

Moreover, it is not essential that the filaments 1 and 2 be wire and fiber filaments, respectively, inasmuch as the present invention consists essentially in providing reinforcing filaments which are arranged as set forth in the claims and which have different stretchabilities. Thus, the filaments can be made of different materials such as twisted steel wires or other low elongation cord, or of fibers of natural textile materials such as cotton or rayon, or of fibers of synthetic textile material such as polyamides, superpolyamides, polycondensates or polyaddition products. Moreover, the different stretchabilities can be obtained from fibers or wires made of the same material but processed in different ways, such as from textile materials which are twisted to different extents.

If desired, an additional insert 6 may be embedded in the tire body 10 adjacent the outer rim thereof. The insert has substantially the same width as the rim of the tire body and may be in the form of a twisted web composed of filaments having a stretchability corresponding to that of the filaments 2. Alternatively, the insert 6 may be composed of but a single layer of such filaments, in which case it has been found desirable to arrange the filaments in such a manner that they extend in susbtantially the same direction as the filaments 2.

Fig. 4 shows an arrangement wherein the anchoring means for the filaments of low and high stretchability 21 and 22 consist of but two annular beads 23, one of which is shown in Fig. 3 as being embedded in the tire body 20 adjacent one of the inner face edges 20'.

Figure 6:
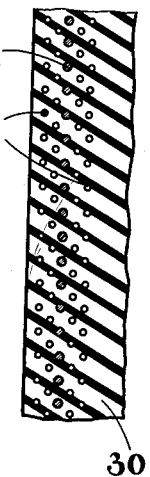
Fig. 6 is a fragmentary sectional view taken along line 6—6 of Fig. 5.
Figure 7:
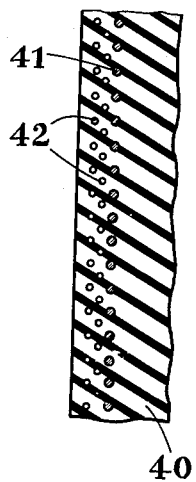
Fig. 7 is a fragmentary sectional view taken along a line corresponding to line 6—6 of Fig. 5 of a tire in which the reinforcements are arranged according to another embodiment of the present invention.
Figure 8:
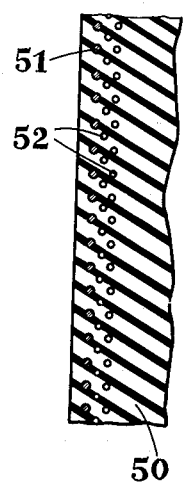
Fig. 8 is a fragmentary sectional view taken along a line corresponding to line 6—6 of Fig. 5 of a tire in which the reinforcements are arranged according to yet another embodiment of the present invention.

Figs. 5 and 6 shown an arrangment in which layers of filament 32 of high stretchability are arranged on opposite sides of a layer of filaments 31 of low stretchability, the transverse plane of symmetry of the tire body 30 being indicated at 35, whereas Figs. 7 and 8 show arrangements in which the layers of filaments of low stretchability are on the same side as the layer of filaments of high stretchability. In Fig. 7, the layers of filaments 42 of high stretchability are embedded in the tire body 40 interiorly of the layer of filaments 41 of low stretchability, and in Fig. 8 the layers of filaments 52 of high stretchability are embedded in the tire body 50 exteriorly of the layer of filaments 51 of low stretchability.

Figure 9:
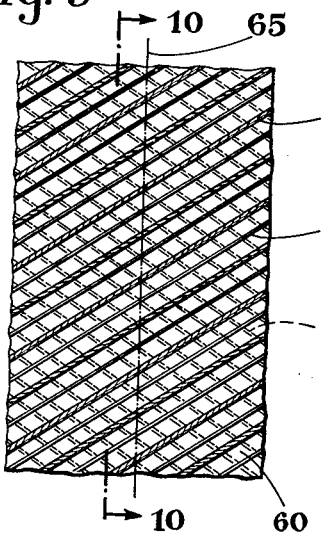
Fig. 9 is a diagrammatic representation of the manner in which the reinforcements in a tire may be arranged in a still further embodiment of the present invention.
Figure 10:
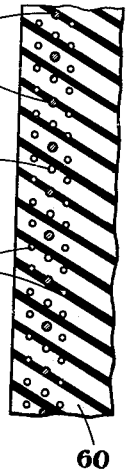
Fig. 10 is a fragmentary sectional view taken along line 10—10 of Fig. 9.

Figs. 9 and 10 show an arrangement wherein layers of filaments 62 of high stretchability are embedded in the tire body 60 on opposite sides of a layer of filaments 61 of low stretchability. The latter are spaced rather widely apart, and additional filaments 62' which preferably have a stretchability corresponding to that of the filaments 62 are embedded in the tire body 60 at the level of the layer of filaments 61 and respectively alternate with the latter. This type of construction has been found to be particularly useful in cases where the tires are not required to support excessive loads.

It will be understood that each of the elements described above, or two or more together, may also find a useful application in other types of reinforced tires differing from the types described above.

While the invention has been illustrated and described as embodied in vehicle tire, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be compreheneded within the meaning and range of equivalence of the following claims.

What is claimed as new and desired to be secured by Letters Patent is:

1. In a tire, in combination, a tire body of annular configuration and substantially U-shaped cross section having a pair of spaced inner annular edge portions; at least one annular anchoring means embedded along each of said annular edge portions of said tire body; a layer of first filaments embedded in said tire body substantially evenly distributed over the whole length thereof and extending respectively uninterrupted from one to the other edge portion thereof, with the ends of said filaments wound about said anchoring means, respectively, said first filaments being arranged substantially parallel to each other and being inclined to the transverse plane of symmetry of said tire body at an angle of less than 90°; and at least two layers of second filaments having a stretchability substantially greater than that of said first filaments also embedded in said tire body substantially evenly distributed over the whole length thereof and extending respectively uninterrupted from one to the other edge portion thereof, with the ends of said filaments wound about said anchoring means, respectively, said layers of second filaments being arranged on opposite sides of said layer of first filaments and substantially symmetrical with respect thereto, said second filaments also being arranged substantially parallel to each other and being inclined to said plane but crossing over said first filaments, all of said first filaments of lesser stretchability being arranged in the same direction and being crossed only by said second filaments having a stretchability substantially greater than said first filaments.

2. The combination defined in claim 1, and a plurality of additional filaments having a stretchability corresponding to that of said second filaments, said additional filaments being embedded in said body at the level of said layer of first filaments and respectively alternating with the latter, all of said first filaments of lesser stretchability being arranged in the same direction and being crossed only by said second filaments having a stretchability substantially greater than said first filaments.

3. A tire as defined in claim 1 in which said first filaments are arranged inclined to the transverse plane of symmetry of said tire body at an angle of between 20° to 60° and in which said second filaments are inclined to said plane substantially at the same angle but in opposite direction so as to cross over said first filaments.

4. A tire as defined in claim 1 in which said first filaments are arranged inclined to the transverse plane of symmetry of said tire body at an angle of substantially 45° and in which said second filaments are inclined to said plane substantially at the same angle but in opposite direction so as to cross over said first filaments.

References Cited in the file of this patent

UNITED STATES PATENTS

| | | |
|---|---|---|
| 2,317,912 | Howe | Apr. 27, 1943 |
| 2,423,995 | Reynolds | July 15, 1947 |
| 2,541,506 | Cutherbertson et al. | Feb. 13, 1951 |
| 2,703,128 | Darrow | Mar. 1, 1955 |

FOREIGN PATENTS

| | | |
|---|---|---|
| 251,206 | Great Britain | Apr. 29, 1926 |